United States Patent [19]

Rowlette

[11] Patent Number: 4,964,698
[45] Date of Patent: Oct. 23, 1990

[54] SYSTEM FOR SELECTIVE LASER ASSISTED PLATING

[75] Inventor: John R. Rowlette, Clemmons, N.C.

[73] Assignee: AMP Incorporated, Harrisburg, Pa.

[21] Appl. No.: 411,355

[22] Filed: Sep. 22, 1989

[51] Int. Cl.$^5$ .......................... G02B 27/00; G03H 1/28
[52] U.S. Cl. ...................................... 350/320; 350/3.7; 350/3.75
[58] Field of Search ................ 350/319, 320, 321, 3.7, 350/3.75, 3.66–3.69, 3.85, 3.8; 427/53.1; 430/1, 945; 204/29, 207, 210; 219/121.76, 121.77; 356/401, 4; 73/67.5; 250/548

[56] References Cited

U.S. PATENT DOCUMENTS

| | | | |
|---|---|---|---|
| 3,990,296 | 11/1976 | Erikson | 73/67.5 |
| 4,170,396 | 10/1979 | Kraft | 350/3.70 |
| 4,348,263 | 9/1982 | Draper et al. | 204/29 |
| 4,359,259 | 11/1982 | Horner et al. | 350/3.7 |
| 4,427,723 | 1/1984 | Swain | 427/53.1 |
| 4,473,445 | 9/1984 | Smith et al. | 204/26 |
| 4,555,321 | 11/1985 | Wicks | 204/224 R |
| 4,826,290 | 5/1989 | Wreede et al. | 350/320 |
| 4,832,798 | 5/1989 | Cvijanovich et al. | 204/29 |
| 4,862,008 | 8/1989 | Oshida et al. | 250/548 |

OTHER PUBLICATIONS

Gold Bulletin, 1986, 19, "Laser Surface Alloying of Gold".

Primary Examiner—Rodney B. Bovernick
Assistant Examiner—Thong Nguyen
Attorney, Agent, or Firm—William B. Noll

[57] ABSTRACT

A method directed to a system for splitting, imaging and focusing a pulsing laser beam, such as from an excimer laser, onto a workpiece to improve the subsequent metal plating of such workpiece. A preferred technique of laser assisted plating is a system for laser ablating a plurality of contact areas on electrical terminals, where the areas are covered by ablatable resist. The preferred system comprises a carrier strip having a plurality of electrical terminals mounted thereon; a pulsed laser for directing radiation at the carrier strip; a hologram mounted in the radiation path between the laser and the carrier strip for splitting the radiation from the laser into a plurality of radiation beams directed towards the plurality of contact areas; and mechanism for synchronizing the movement of the carrier strip with the pulsing of the laser so that a respective one of the plurality of outgoing beams ablates the resist over a respective one of the contacts as the contact areas move past the hologram.

6 Claims, 2 Drawing Sheets

SYSTEM FOR SELECTIVE LASER ASSISTED PLATING

RELATED INVENTIONS

This invention represents an improvement of the system taught in U.S. Application Ser. No. 273,381, assigned to the assignee herein, where each system is essentially directed to laser beam focussing to effectively and efficiently utilize the energy thereof, particularly in the field of laser assisted plating. A preferred embodiment of laser assisted plating is taught in U.S. Application Ser. No. 180,417, now U.S. Pat. No. 4,877,644 assigned to the assignee herein.

FIELD OF THE INVENTION

This invention relates to an effective and efficient system for splitting, imaging and focussing a laser beam onto a controlled or precisely defined area of a workpiece.

BACKGROUND OF THE INVENTION

This invention is directed to a method and apparatus to effectively and efficiently split, image, and focus a laser beam, preferably an excimer laser for the purpose of laser assisted plating, onto a workpiece.

A preferred embodiment of this invention lies in the practice of laser assisted plating of electrical terminals. Typically, such terminals are stamped and formed from an electrically conductive metal strip and are attached to a carrier strip which is useful for strip feeding the terminals through successive manufacturing operations. The final manufacturing operation involves plating the electrical contact surfaces of the strip fed terminals with precious metal or semi-precious metal, such as gold or alloys thereof. Such metals are characterized by good electrical conductivity and little or no formation of oxides that reduce said conductivity. Therefore these metals, when applied as plating, will improve conductivity of the terminals. However, the high cost of these metals has necessitated precision deposition on the contact surfaces of the terminals, and not on surfaces of the terminals on which plating is not necessary. Precision deposition is therefore very critical to a cost effective operation. Further, the high cost of equipment, and the operation and maintenance thereof, requires efficiency in the plating procedures.

There are conventional selective plating practices which do not utilize lasers, but rather relate to apparatus which includes a rotating mandrel for guiding terminals through a plating solution. See U.S. Pat. Nos. 4,555,321 and 4,473,445. One difficulty associated with such apparatus is the ability to control the precious metal deposition to extremely small contact areas, and the close proximity of adjacent terminals on a carrier strip.

The introduction of laser technology to the plating process has resulted in new approaches to such process. U.S. Pat. No. 4,348,263 to Draper et al and directed to a process for surface melting of a substrate prior to plating, teaches a method of making an electrical contact by the steps of applying a first protective layer to a substrate, subjecting said protective layer and a portion of said substrate to melting by means of an electron beam or laser prior to the deposition. A related work by Draper, published in the *Gold Bulletin*, 1986, 19, entitled "Laser Surface Alloying of Gold," contains an illustrated showing on the mechanism of laser surface alloying by the use of focussed laser pulsing.

As applied herein, by way of example only, laser assisted plating may consist of improving the substrate prior to plating; precise removal of a plating resist to expose defined contact plating areas; or, laser plating in vacuum. The latter two techniques are taught, respectively, in co-pending application, Ser. No. 180,417, and assigned to the assignee herein, and U.S. Pat. No. 4,427,723 to Swain. Said co-pending application teaches a method for the selective plating of a metal substrate, which method includes the steps of selecting a laser wavelength which is strongly absorbed by the metal substrate, i.e. reflectivity of less than about 70%, choosing a polymer based plating resist having a low optical coefficient of absorption to a laser wavelength, typically between about 248 to 360 nm, curing said resist, preferably subjecting selective areas of said resist to a single excimer laser shot, having a wavelength between about 248 to 360 nm, to heat the metal substrate and thereby cause ablative removal of the resist over the selective areas of said substrate, and subjecting said exposed portions of said substrate to metal plating.

The Swain patent teaches a method and apparatus for vacuum depositing and annealing, wherein a coating material is evaporated by the action of a laser beam, while the substrate to be coated is scanned by another laser beam to cause localized heating and depositing of the coating material on the substrate.

In such practices utilizing an excimer laser or other such laser producing a characteristically broad output beam, whose size and shape at the laser exit are determined mainly by the discharge electrodes and hence are beyond control of the user, there has been no apparent attempt to direct or transmit the laser beam in a way to substantially utilize the full energy of the laser beam. Specifically, in material processing with excimer lasers, a specific interaction area is generally defined by utilizing an aperture to restrict the beam. When an aperture with a small opening is used, a large portion of the beam is wasted, since excimer lasers typically have large-area output beams. The alternative of focussing the entire beam onto the area of a small aperture can damage the aperture and optics and will increase the beam divergence. A mask with multiple apertures placed within the beam cross section can give a degree of parallel processing, but the fraction of light wasted between apertures may still be large.

In copending application U.S. Application Ser. No. 273,381, , a system is described to better utilize the energy of the laser. Such system comprises an excimer laser emitting a beam having a predetermined cross-section, one or more elongated light-guides, i.e. rods, strips or fibers, to direct said beam, where the cross-sections thereof are sufficient to completely fill said laser beam cross-section, and means for shaping and focussing said beam to a reduced image on a workpiece.

The present invention represents a further improvement thereover by the use of an efficient holographic beam splitter and imaging technique for laser assisted plating. The use of holograms or holographic components are of recent origin, but are nevertheless known. For example, U.S. Pat. No. 4,170,396 to Kraft discloses a holographic component including a carrier member and a plurality of sub-holograms formed thereon. The component may create a division of a beam of spaciously coherent radiation into a plurality of different partial beams. The component may be used in a holographic storage system, or in an optical material processing system which uses a laser to solder or weld. A YAG laser of continuous operation is used as a source. The component divides a beam for soldering or welding at discrete separate point.

By way of further example, U.S. Pat. No. 4,359,259 to Horner et al discloses a holographic fiber optic directional coupler for separating an incoming beam into a plurality of outgoing beams and for combining a plurality of incoming beams into a single outgoing beam in the reverse direction. The system is used for an optical fiber communication system.

Neither of the latter patents teach an efficient system which utilizes a holographic laser beam splitter and imaging technique in a laser assisted plating operation. More particularly, such patents fail to teach or suggest the use of a pulsed laser which is synchronized to the speed of a moving workpiece, such as electrical terminals joined by a carrier strip, whereby multiple terminals may be treated concurrently.

BRIEF SUMMARY OF THE INVENTION

The present invention relates to an effective system to split, image and focus a pulsing laser beam, such as from an excimer laser, onto a workpiece to improve the metal plating thereof. A preferred technique of laser assisted plating is a system for laser ablating a plurality of contact areas on electrical terminals, where said areas are covered by an ablatable resist. Such a system comprises a carrier strip having a plurality of said electrical terminals mounted thereon;

a pulsed laser for directing radiation at said carrier strip;

a hologram mounted in the radiation path between said laser and said carrier strip for splitting and imaging the radiation from said laser into a plurality of radiation beams directed towards said plurality of contact areas; and means for synchronizing the movement of said carrier strip with the pulsing of said laser so that a respective one of said plurality of outgoing beams ablates said resist over a respective one of said contact as said contact areas move past said hologram.

DETAILED DESCRIPTION OF PREFERRED EMBODIMENT

Figure 1:
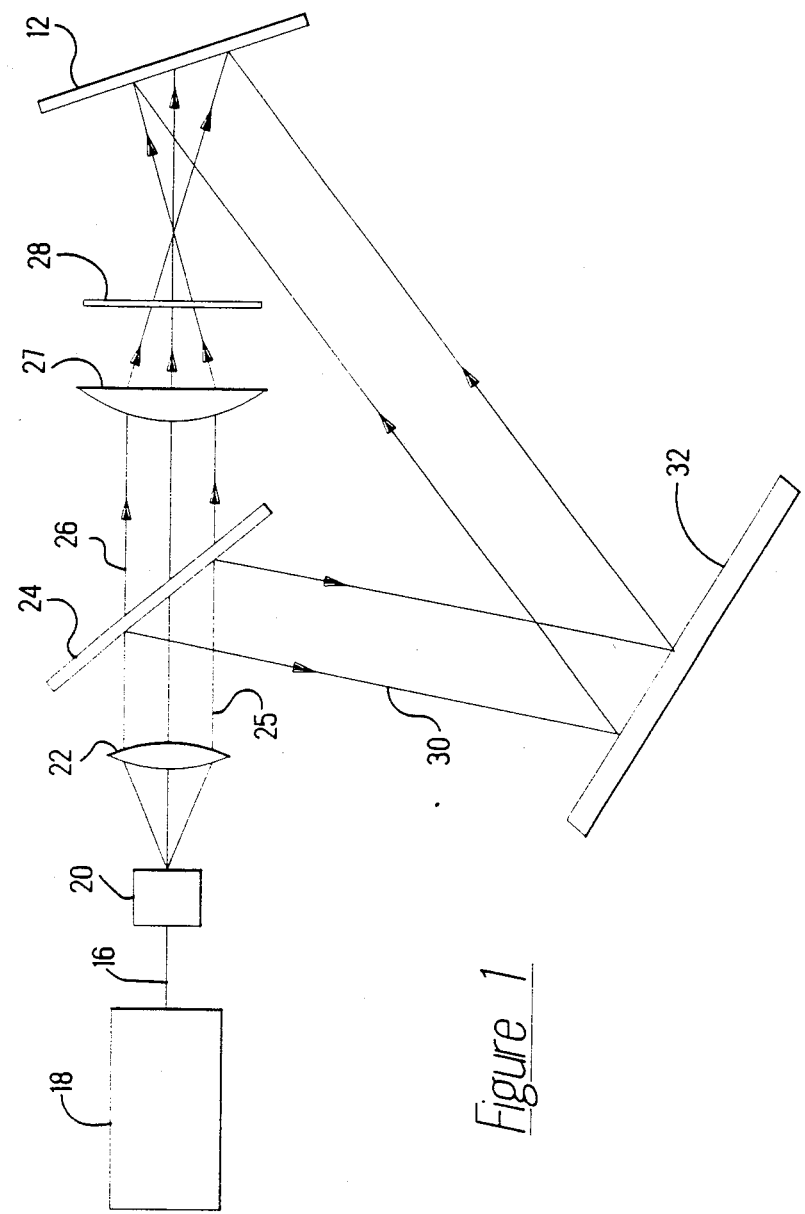
FIG. 1 is a schematic representation of a technique for producing the hologram utilized in the practice of this invention.

The present invention is directed to an efficient system for splitting, imaging, and focussing a pulsed laser onto a workpiece to effect changes to such workpiece. More particularly, the preferred purpose hereof is to split, image and focus such beam onto a workpiece, such as a carrier strip containing a plurality of spaced apart electrical terminals, to effect surface changes in the workpiece, ablate precise areas of a plating resist on said workpiece, and/or effect plating of said workpiece by a transfer mechanism. While each such technique relates to laser assisted plating, and to each this invention is applicable, the further description will be limited, by way of example, to laser ablation of terminal contact areas.

The significance of this invention may best be appreciated by considering first the technology of lasers. In the field of laser applications there are several commercial units which operate at different wavelengths. For example, excimer lasers form a group of pulsed high-pressure rare gas halide lasers which emit various ultra-violet wavelengths, depending on the lasing medium, such as 193 nm, 248 nm, 308 nm and 351 nm. At the opposite end of the spectrum, operating in the infrared region are such lasers whose laser sources are carbon dioxide ($CO_2$), and neodymium doped yttrium-aluminum garnet (Nd:YAG). By way of example and comparison, representative wavelengths for the three commercial laser units are as follows:

Excimer:193, 248, 308, 351nm $Co_2$:10,600nm

Nd:YAG:1,064nm

Excimer lasers have been found to be particularly effective in laser assisted plating by the fact that the wavelength range is especially suitable for coupling with the metal substrate, and transparent to the plating resist. Accordingly, the further description will be limited to the use of excimer lasers having the performance parameters* depicted in TABLE I.

TABLE I

| | ArF | KrCl | KrF | XeBr | XeCl | XeF |
|---|---|---|---|---|---|---|
| Wavelength (nm) | 193 | 222 | 248 | 282 | 308 | 351 |
| Output energy ($\mu$J/pulse) | 200 | 50 | 250 | 10 | 80 | 80 |
| Repetition rate (Hz) | 100 | 100 | 150 | 100 | 150 | 100 |
| Pulse width (ns) | 10–20 | 5–15 | 10–20 | 7–20 | 4–20 | 10–20 |
| Beam size | | | 1 × 2.5 cm | | | |
| Beam divergence | | | 2 × 5 mrad | | | |

*parameters supplied by "Laser Processing and Analysis of Materials", by W. W. Duley - Plenum Press, 1983

A significant parameter of an excimer laser is the rather large beam size, typically rectangular in shape having dimensions of about 1×2.5 cm. Typically, as described above, it is necessary to reduce and modify the rectangular shape thereof to a diamond-shape or parallelogram, for example, the dimensions of which are 20×30 mils. Heretofore, the reduction was achieved by a combination of shaping apertures and imaging lens, but only at the expense of wasting energy. By way of example, a typical output energy per pulse of an excimer laser operating in the range of 248 to 308 nm is approximately 250 to 80 $\mu$J/pulse. However, by this conventional technique described above, by way of example, to selectively ablate a polymer resist from a metal substrate to yield a well defined shape for selective electrodeposition, the required energy density for ablation has a minimum threshold of approximately 1.5 Joules/cm$^2$. The energy density of the beam as $\mu$J emitted from the laser is approximately 75 $\mu$J/cm$^2$. The aperture must be large enough to capture sufficient energy that when focused onto the target the appropriate energy density can be achieved. The mask is imaged onto the target and defines the shape of the ablated spot. Typically in such process, as indicated above, the required energy for ablation of a 20×30 mil area is 6 $\mu$J and the total beam energy is 250 $\mu$J. The excess energy is reflected by the mask and discarded, yielding an energy ablation efficiency of about 2.4%.

Any attempt to improve the performance by doubling-up has its limits. A mask was designed to accommodate two images on the same mask, so that two contact areas could be ablated simultaneously with each laser pulse. This could possibly be achieved for two images, but quickly becomes impractical for more than two images. This is because as the beam is expanded to accommodate the increased mask size, the energy density is reduced and therefore the mask needs to be expanded to capture sufficient energy to achieve ablation. The optics and fixturing to achieve this quickly becomes very expensive and the precision alignment of these components becomes much more difficult. This makes such a system complex and difficult to operate.

By the system of this invention, which utilizes holographic technology, such waste is significantly reduced. Also, by effective use of the laser, significant savings in maintenance are realized. That is, this system will increase the lifetime of the lasing medium (gas), optics and thyratron, as the reliability of an excimer laser is shot dependent. Thus, by reducing the number of shots required to ablate the contact areas, the overall reliability is increased.

Figure 2:
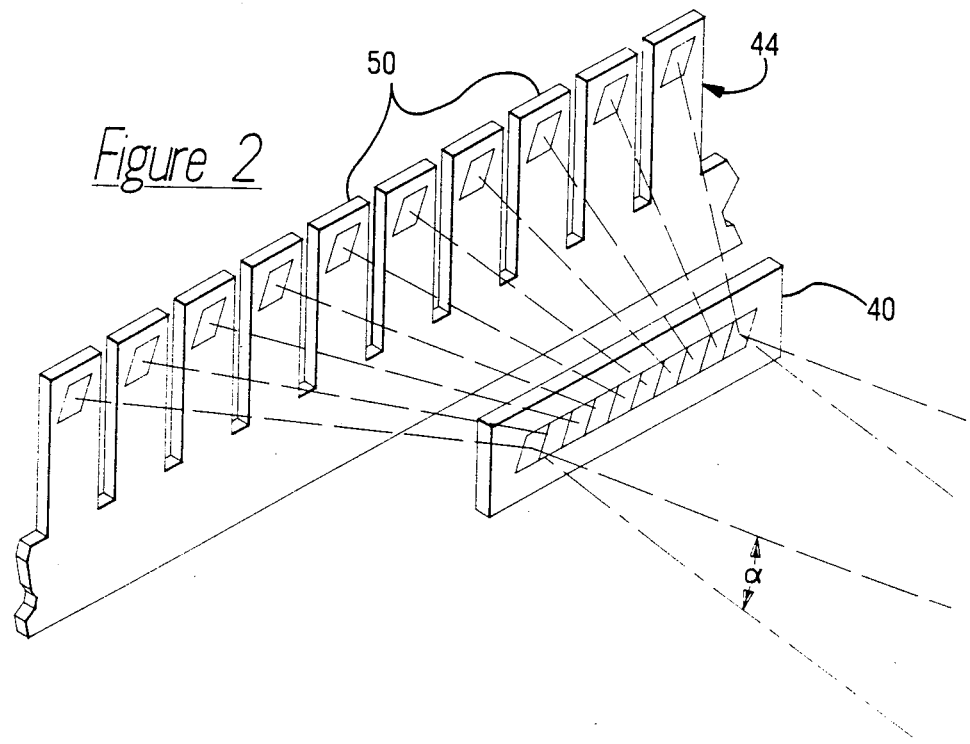
FIG. 2 is a schematic representation of the system of this invention.
Figure 3:
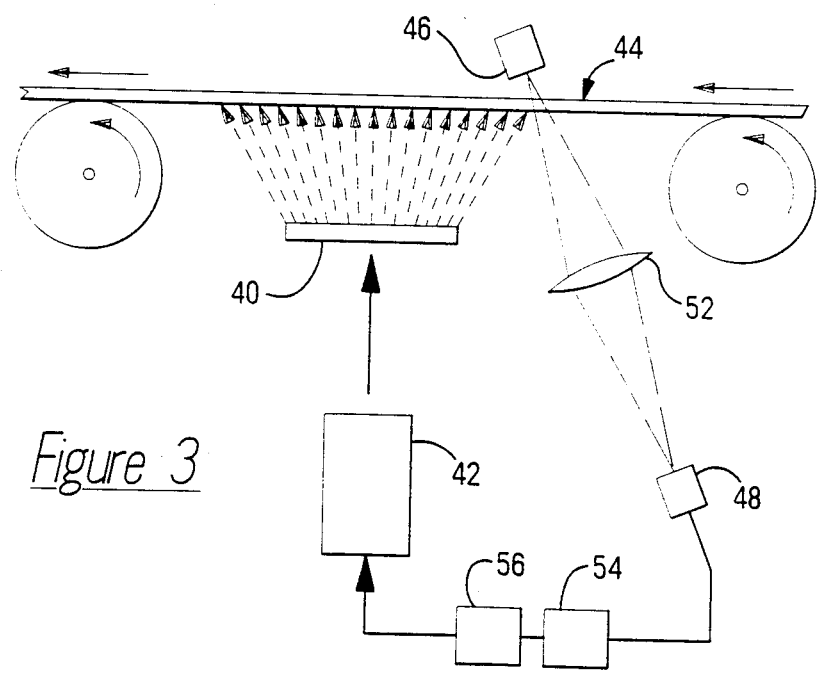
FIG. 3 is a simplified schematic representation of the mechanical system of this invention.

The present invention eliminates such waste by the system illustrated schematically in FIGS. 2 and 3, where a component thereof is a hologram. In this regard, the schematic representation of FIG. 1 shows a technique for producing such hologram. In order to fully understand the system of this invention, it may be helpful to describe the technique for producing the holographic optical element of this invention.

To form an exemplary transmissive holographic element, as may be used herein, a holographic film plate 12 must be prepared, as more fully described hereinafter. It is known however that the holographic method requires that two special conditions be met. One is that there must be specifically two beams incident on the holographic film plate, i.e. reference beam and object beam. The two beams are required to form the interference pattern. The second requirement of light used in holography is that it must be coherent. Essentially this eliminates all ordinary light sources, leaving the laser as the only satisfactory source. Further, to be effective, the material forming the holographic layer must have sufficient sensitivity within the spectral region in which the system is exposed, i.e. it must be a photosensitive medium of suitable speed. Also, the material must be of sufficient thickness, typically about 1 to 50 micrometers, so as to achieve a high diffraction efficiency and to provide sufficient spatial bandwidth for proper operation. Materials suitable for this purpose are well known and may comprise developable photopolymers, or the like.

To form the desired index of refraction variations in the holograhic layer, the arrangement illustrated in FIG. 1 is used. A laser beam 16, from an argon-ion laser 18, is spatially filtered by a spatial filter 20 to create a spatially diverging beam which is collimated by lens 22. The collimated beam 25 is split by a beam splitter 24 into two collimated beams, object beam 26 and reference beam 30. Object beam 26 impinges onto cylindrical lens 27 and beam shaping aperture 28 onto the holographic emulsion layer, such as dichromated gelatin, of plate 12. Similarly, the reference beam 30 is reflected off of mirror 32 onto said emulsion layer. After such exposure, and proper processing as known in the art, a holographic image is thus formed. In this embodiment, the holographic image was Bragg corrected to accommodate reconstruction at the appropriate wavelengths of the excimer laser. However, before such processing, the process is stepped, i.e. plate 12 moved laterally a predetermined distance and repeated to form a multiple image array, ten images being illustrated in FIG. 2. The preferred holographic material in which images are formed is highly transparent (>9 99.9of transmittance) to excimer wavelength and exhibits a high damage threshold, thereby avoiding damage from the laser pulse. Such material, as recognized in the art, may be selected from a family of materials such as dichromated gelatin (DCG). For a brief discussion thereof, reference may be made to /SPIE Vol. 883 Holographic Optics: Design and Applications (1988) Pp. 84–93.

The hologram 40, as produced by the technique of FIG. 1, for example, may now be incorporated into the system of this invention. From FIGS. 2 and 3, it will be seen that the hologram 40 is placed in the radiation path between the pulsed excimer laser 42 and the workpiece 44, i.e. carrier strip containing a plurality of electrical terminals a contacts 50 mounted thereon. The hologram 40 splits the radiation from laser 42 into a plurality of radiation beams in a manner predetermined by the construction of the hologram. In this embodiment, the angle "$\alpha$" represents the Bragg reconstruction angle, or the angle of correction to accommodate reconstruction of the hologram at the appropriate wavelength of the laser. For convenience, and by way of example only, FIG. 2 shows such splitting into multiple, i.e., ten images unto the workpiece 44.

In the practice of this invention, the workpiece 44 is caused to traverse a path, designated by the directional arrow, in the laser treatment area in a continuous manner. The movement, by a predetermined distance is synchronized with the pulsing of the laser so that a plurality of contact areas of the workpiece surface are ablated, or otherwise altered. Such synchronization may be accomplished by a system which includes an illumination source 46 and photodetector 48. By the nature of the workpiece 44, as more clearly shown in FIG. 2, there is revealed a plurality of individual contacts 50, each of which are uniformly spaced apart from an adjacent contact 50, i.e. a picket fence arrangement. The illumination source 46, through lens 52, images such picket fence onto the photodetector 48 which reads or detects the passing contacts 50 by the light/no light (space/contact). A counter 54, electrically interconnected and positioned between photodetector 48 and laser trigger mechanism 56, counts the passing contacts 50. In the embodiment described herein which treats ten contacts, the counter 54 divides the signal by ten then transmits a signal directly or through trigger mechanism 56 to energize laser 42. By such a system, a laser operating in a time frame of nsec. in a single pulse can ablate or otherwise treat a plurality of contacts on a passing workpiece, which at best is moving at a rate measured in micro-seconds.

I claim:

1. A method of improving a surface of a metallic workpiece for subsequent selective metal plating thereof, where at least one workpiece is joined to a carrier strip, comprising the steps of
    a) positioning a pulsed laser, operating at a predetermined pulsing rate, near said workpiece,
    b) preparing a hologram capable of splitting a radiation beam of said pulsed laser,
    c) placing said hologram intermediate said pulsed laser and said workpiece, d) directing the radiation beam of said pulsed laser towards said hologram and said carrier strip, where said hologram is within a radiation path between said pulsed laser and said carrier strip, e) splitting the radiation beam at said hologram into a plurality of radiation beams directed towards said metal workpiece, and f) coordinating the movement of said carrier strip with the pulsing rate of said laser so that a respective one of said plurality of radiation beams affects at least one said metal workpiece as said metal workpiece moves past said hologram.

2. The method according to claim 1 wherein said plurality of radiation beams from said hologram are directed to multiple images on a single workpiece.

3. The method according to claim 1 wherein said laser is a pulsed laser operating at a wavelength between about 248 to 360 nm, and that the radiation beams thereof are capable of ablating areas of plating resist from said metal workpiece.

4. The method according to claim 1 including the step of correcting the angular relationship of the hologram with respect to a reference angle of the said radiation path to accommodate reconstruction of said hologram at the operating wavelength of said pulsed laser.

5. The method according to claim 3 wherein said hologram is prepared from a material that exhibits a high damage threshold within said laser operating wavelength.

6. The method according to claim 5 wherein said material is a dichromated gelatin.

* * * * *